United States Patent
Aoyama

[11] Patent Number: 5,772,940
[45] Date of Patent: Jun. 30, 1998

[54] METHOD OF MANUFACTURING MOLDINGS AND AN APPARATUS THEREOF

[75] Inventor: Yoshihiro Aoyama, Ohbu, Japan

[73] Assignee: Tokai Kogyo Kabushiki Kaisha, Ohbu, Japan

[21] Appl. No.: 707,207

[22] Filed: Aug. 30, 1996

[30] Foreign Application Priority Data

Aug. 31, 1995 [JP] Japan .................................. 7-248368

[51] Int. Cl.[6] .................................................. B29C 47/16
[52] U.S. Cl. .................... 264/167; 264/177.16; 425/381; 425/465; 425/466
[58] Field of Search ............................... 264/167, 177.1, 264/177.16–177.2, 40.7; 425/465, 466, 381

[56] References Cited

U.S. PATENT DOCUMENTS

| | | | |
|---|---|---|---|
| 4,584,150 | 4/1986 | Ballocca ................................... | 264/167 |
| 4,765,936 | 8/1988 | Ballocca ................................... | 264/167 |
| 5,167,893 | 12/1992 | Yada et al. .......................... | 264/177.16 |
| 5,190,338 | 3/1993 | Yada ...................................... | 264/40.7 |
| 5,229,054 | 7/1993 | Yada et al. .............................. | 264/167 |
| 5,474,729 | 12/1995 | Yada ...................................... | 264/167 |
| 5,489,409 | 2/1996 | Koganezawa et al. ................. | 264/167 |
| 5,507,992 | 4/1996 | Yada et al. .............................. | 264/167 |

Primary Examiner—Jeffery R. Thurlow
Attorney, Agent, or Firm—Oblon, Spivak, McClelland, Maier & Neustadt, P.C.

[57] ABSTRACT

In a method of manufacturing moldings and an apparatus therefore, a ridge piece 20 protrudes from a molding main body 10 of a molding 1 in a lip manner is removed gradually from a leading end side to a root side by a lip removing piece 33 moving together with a second die 32 which changes the extrusion contour of the molding main body 10, then the ridge piece 20 is removed by the movement of the second die 32 without decreasing the thickness of the ridge piece 20 thinning. Accordingly, the ridge piece 20 can be removed effectively by the simple operation and apparatus without requiring the operation such as the after-treatment, which can result in the improvements of the productivity of the molding 1, the appearance of the molding 1, and the reliability.

5 Claims, 2 Drawing Sheets

METHOD OF MANUFACTURING MOLDINGS AND AN APPARATUS THEREOF

BACKGROUND OF THE INVENTION

1. Field of the Invention

The present invention relates to a method of manufacturing moldings and an apparatus therefore, each of which removes a disused portion of a ridge piece protruding from a molding main body of a molding, by a lip removing means.

2. Description of the Related Art

Moldings are used for various apparatuses. For example, a windshield molding is fitted to a peripheral edge portion attached to a wind opening portion of a body panel of a vehicle. In more specific terms, an elongate gap is formed continuously between the peripheral edge of the windshield glass and the wind opening edge of the vehicle body panel from an upper portion to a side portion, an elongate molding main body is inserted into the elongate gap to thereby seal and decorate it, and press the ridge piece protruding from the molding main body in a lip manner toward the body panel, which results in the improvement of the stability in the attitude of the windshield molding.

On the other hand, there are variously made proposals in the molding that the shape of the extrusion-molding port is changed by using the movable die as the extrusion-molding die apparatus, so that the sectional shape is made different according to the position of fitting the molding. Further, there is carried out conventionally a method of providing or removing the above-mentioned lip-like ridge piece according to the change of the sectional shape of the extrusion-molding port.

For example, a method of manufacturing moldings according to Japanese Patent Laid Open (KOKAI) No. 4(1992)-303633, comprises the steps of extrusion-molding unitedly the molding main body and the lip-like ridge piece, and inserting the movable die (lip removing means) into the extrusion-molding port, thereby removing the lip-like ridge piece from the root portion where the lip-like ridge piece is useless. Incidentally, in such a method, the sectional shape of the molding main body is kept constant throughout the entire length.

However, in a case where the prior art method and apparatus each of which removes the disused portion of the lip-like ridge piece by the lip removing means, are applied to the variable extrusion-molding method and apparatus each of which changes the extrusion contour of the molding main body due to the movement of the movable die, the movable die which changes the extrusion contour of the molding main body and the movable die (lip removing means) which removes the lip-like ridge piece must be operated individually, which brings about the troublesome manufacturing, and the complication and the enlargement in size of the apparatus.

Further, a means in conceivable, in which the opening for extrusion-molding the lip-like ridge piece is closed gradually in the thicknesswise direction of the ridge piece by one part of the movable die which changes the extrusion shape of the molding main body to thereby remove the ridge piece, however, in this case, the thin lip-like ridge piece is remained just before the lip-like ridge piece is perfectly removed, so that the thin lip-like ridge piece is required to be after-treated, and so forth, which results in the decrease in productivity.

SUMMARY OF THE INVENTION

It is, therefore, an object of the invention to provide a method of manufacturing moldings and an apparatus therefore, each of which carries out the extrusion-molding while changing the extrusion contour of a molding main body due to the movement of a movable die, to thereby remove a lip-like ridge piece easily and effectively.

In order to attain the above-mentioned object, the present invention provides a method of manufacturing moldings, for extrusion-molding continuously moldings each comprising an elongate molding main body, and a ridge piece protruding from the molding main body in a lip manner, while changing an extrusion contour of the molding main body due to the movement of a movable die, and for removing the ridge piece from the molding main body by a lip removing means at a predetermined extrusion position, wherein the lip removing means is moved together with the movable die when the ridge piece is removed from the molding main body, and the lip removing means is moved gradually from a leading end side toward a root side, thereby the ridge piece is removed gradually from the leading end side toward the root side.

Further, the present invention provides an apparatus for manufacturing moldings, having an extrusion-molding port for extrusion-molding continuously moldings each comprising an elongate molding main body, and a ridge piece protruding from the molding main body in a lip manner, a movable die for carrying out the extrusion-molding while changing the shape of the extrusion-molding port corresponding to the molding main body, and a lip removing means for removing the ridge piece from the molding main body at a predetermined extrusion position, wherein the lip removing means is disposed so as to move together with the movable die, and is adapted to move gradually from a leading end side toward a root side of the ridge piece, thereby the ridge piece is removed gradually from the leading end side toward the root side.

According to the above-mentioned method and apparatus, the ridge piece can be removed by the lip removing means moving together with the movable die which changes the extrusion contour of the molding main body, and the ridge piece is removed gradually from the leading end side toward the root side with the initial thickness maintained without thinning. Accordingly, the ridge piece can be removed only by operating and controlling the movement of the movable die without the after-treatment.

Also preferably, in the molding manufacturing method according to the present invention, the lip removing means is moved together with the movable die in an opposite direction after the ridge piece is removed from the molding main body, the lip removing means is moved gradually from the root side toward the leading end side of the ridge piece, the ridge piece is formed gradually from the root side toward the leading end side.

According to the above-mentioned method, after the ridge piece is removed from the molding main body, the ridge piece is formed on the molding main body again by the lip removing means moving together with the movable die which changes the extrusion contour of the molding main body, and the ridge piece is formed gradually from the root side toward the leading end side with the initial thickness maintained without thinning. Accordingly the ridge piece can be formed again only by controlling the movement of the movable die without the after-treatment.

According to the method of manufacturing the moldings and the apparatus therefore, the ridge piece protruding from the molding main body of the molding in the lip manner is removed gradually from the leading end side to the root side by the lip removing means moving together with the movable die which changes the extrusion contour of the molding main body, then the ridge piece is removed by the movement of the movable die without thinning. Accordingly, the ridge piece can be removed effectively by the simple operation and apparatus without requiring the operation such as the aftertreatment, which can result in the improvements of the productivity of the molding, the appearance of the molding, and the reliability.

Further objects and advantages of the invention will be apparent from the following description of the preferred embodiment of the invention as illustrated in the accompanying drawings.

DETAILED DESCRIPTION OF THE PREFERRED EMBODIMENT

An embodiment according to the invention will be described hereinbelow with reference to the drawings.

Figure 2:
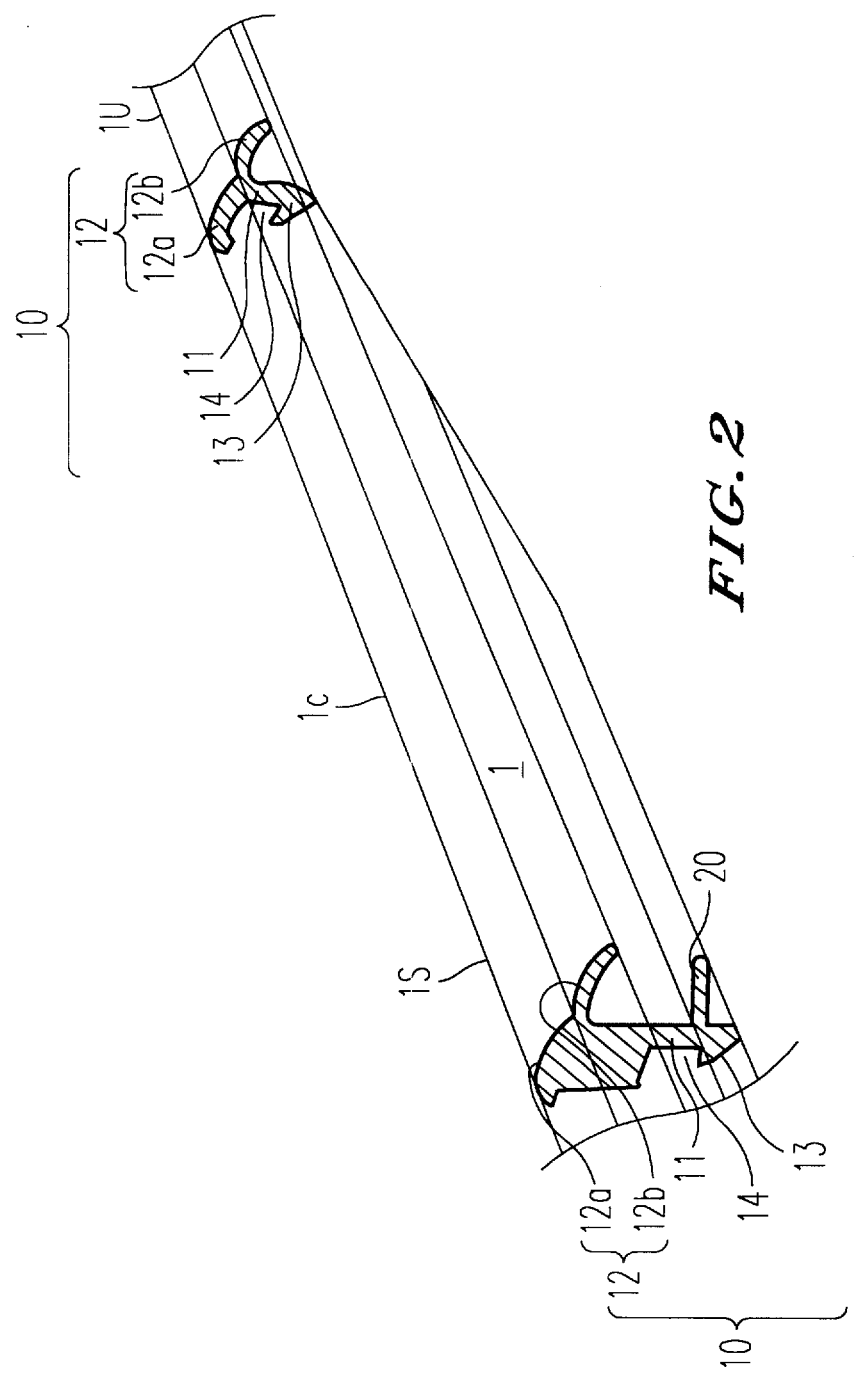
FIG. 2 is a perspective outline view of a molding for use in a vehicle at the instant following the extrusion extrusion-molding die shown in FIG. 1.

First, an embodiment of a windshield molding for use in a vehicle, which is molded according to a molding manufacturing method according to the invention will be described. A windshield molding 1 shown in FIG. 2 is fitted to a peripheral edge portion of a front windshield glass of a vehicle, which has an upper molding 1U fitted in a gap between an upper edge portion of a windshield glass and a roof panel (neither of which is shown), a side molding 1S fitted in a gap between a side edge portion of the windshield glass and a pillar panel, and a corner molding 1C connecting the upper molding lU with the side molding 1S in a curved manner. The respective moldings 1U, 1S, 1C are extrusion-molded continuously as one body as described later.

Such a windshield molding 1 is formed by extrusion-molding an elastic material such as synthetic resin rubber continuously as one body in an elongate band manner by an extruder as will be described hereinafter, and has a molding main body 10 throughout the entire length and a ridge piece 20 protruding from the molding main body 10 in a lip manner extending from the side molding 1S to an intermediate portion of the corner molding 1C.

The above mentioned molding main body 10 is comprised of a leg portion 11 interposed in a gap between the peripheral edge portion of the window glass and a vehicle body panel, and an ornament portion 12 covering the gap from of the vehicle. Also, a metal thin plate (not shown) as a core material is embedded in a portion of the ornament portion 12 to which the leg portion 11 is connected. A plate-like supporting piece 13 pressure-contacting to an inside face of the window glass is disposed with a constant protrusion length on an interior edge (lower edge) of the leg portion 11 throughout the entire length.

On the other hand, the ornament portion 12 has an inner side ornament portion 12a extending from the exterior end (upperend in the drawing) toward the window glass in a lip manner, and an outer side ornament portion 12b extending toward the vehicle body panel in a lip manner, then a glass engagement groove 14 having a substantially C-like cross section is defined between the inner side ornament portion 12a and the supporting piece 13. The glass engagement groove 14 has a constant cross sectional shape throughout the entire length of the molding. Further, the outer side ornament portion 12b of the ornament portion 12 has uniform thickness and shape throughout the entire length of the molding, however, the inner side ornament portion 12a swells and increases in thickness gradually from the corner portion to the side portion, which results in the increase of the total height of the molding accordingly. This is because the step formed between an exterior surface of the window glass and an exterior surface of the vehicle body panel is enlarged from the corner portion to the side portion, and the height of the leg portion 11 is increased and the distance between the glass engagement groove 14 and the outer surface of the ornament portion 12 is increased with the swelling and thickening of the inner side ornament portion 12a.

In more specific terms, the leg portion 11 is set to the lowest in height at the upper molding 1U, and gradually increased in height from the intermediate portion of the corner molding 1C to the side molding 1S, which results in the swelling and thickening of the inner side ornament portion 12a accordingly. Then, the distance between the glass engagement portion 14 and the exterior surface of the ornament portion 12 is gradually increased according to the amount of the swelling and thickening of the inner side ornament portion 12a. Further, the swelling and thickening portion of the inner side ornament portion 12a is the maximum in thickness at the upper end portion of the side molding 1S. The maximum height thereof is kept constant downward of the side molding 1S. Therefore, the leg portion 11 also becomes the maximum in height at the upper end portion of the side molding 1S, the maximum height thereof is kept constant downward of the side molding 1S. Further, the distance between the glass engagement groove 14 and the ornament portion 12 becomes the maximum at the upper end portion of the side molding 1S, so that the maximum distance thereof is kept constant downward of the side molding 1S.

As described above, the ornament port ion 12 is separated from the exterior surface of the window glass corresponding to the swelling and thickening at the swelling and thickening portion of the inner side ornament portion 12a exposed at the side molding 1S, then a predetermined vertical wall surface is formed thereat.

The vertical wall surface exposed due to the swelling and thickening of the inner side ornament portion 12a is formed as a weir for rain water on the window glass, or a gutter for receiving the rain water is disposed on the vertical wall surface in a concave manner so as to open toward the inner side. Such a groove is disposed, for example, extending downward of the intermediate portion of the side molding 1S, and is formed in a predetermined sectional shape such as a substantially rectangle.

On the other hand, the above-mentioned ridge piece 20 is not disposed at the upper molding 1U, but extends gradually from the intermediate portion of the corner molding 1C to the side molding 1S. The ridge piece 20 has the maximum in protruding length at the upper end portion of the side molding 1S, the maximum protruding length is kept constant downward of the side molding 1S.

On this occasion, the ridge piece 20 extends upward and obliquely in the drawing with a predetermined angle (refereed to as reference symbol "a" in FIG. 1 described hereinafter) with respect to the wall surface of the leg portion 11. The leading end of the ridge portion 20 is pressure-contacted resiliently to an inner wall surface of the vehicle body panel (not shown), which results in the stabilization of a fitted attitude of the windshield molding due to the resiliency thereof.

An embodiment of a molding manufacturing apparatus according to the invention, for molding the so-constituted windshield molding 1 for use in the vehicle will be described hereinafter. That is, the above-mentioned windshield molding 1 for use in the vehicle is extrusion-molded through the die apparatus (extrusion-molding die) 30 shown in FIG. 1. The die apparatus 30 is comprised of a first die 31 held in a fixed manner, and a second die 32 adapted to translate straight in the vertical direction (Y-direction in FIG. 2), which is perpendicular to the extrusion direction, with respect to the first die 31. A cross sectional shape of a resin material discharged from the extrusion-molding port 31a which is disposed on the first die 31 is changed according to the translating movement of the second die 32.

Figure 1:
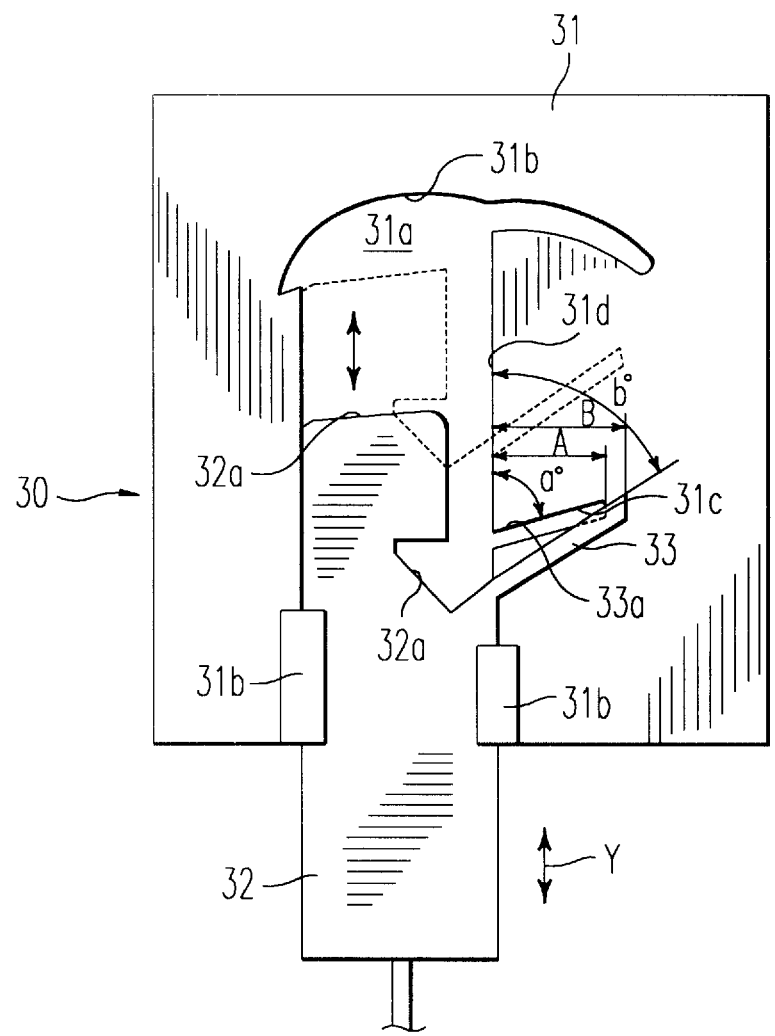
FIG. 1 is a front explanatory view of an extrusion-molding die of an embodiment according to the present invention.

In specific terms, an extrusion-molding port 31a is formed on the first die 31 so as to open to the front end face of the first die 31, and the second die 32 which is comprised of a plate-like member is fitted slidably in the front portion of the first die 31 through a pair of slide guides 31b, 31b so as to close one part of the extrusion-molding port 31a from the lower portion of FIG. 1. Then, an extrusion defining side portion 31e having a contour corresponding to an outer surface of the ornament portion 12 of the windshield molding 1 is formed on the extrusion-molding port 31a of the first die 31, and an extrusion defining side portion 31c having a contour corresponding to the ridge piece 20 of the windshield molding 1 is formed in a slit manner.

On this occasion, the extrusion defining side portion 31c corresponding to the ridge piece 20 is adapted to extend corresponding to the above-mentioned set angle of the ridge piece 20 with respect to the leg portion 11 of the windshield molding 1. In concrete terms, the extrusion defining side portion 31c is formed so as to extend upward and obliquely in the drawing with a predetermined angle "a°" slightly less than 90° with respect to the extrusion defining side 31d corresponding to the wall face of the leg portion 11 of the windshield molding 1.

Further, an extrusion defining side portion 32a having a contour corresponding to the interior surface (surface abutting to the glass) of the ornament portion 12, the leg portion 11 and the supporting piece 13 of the windshield molding 1 is notched on the leading end portion (upper end in the drawing) of the second die 32 with respect to the moving direction. The second die 32 closes one part of the extrusion-molding port 31a of the first die 31, so that an extrusion-molding port corresponding to the whole cross sectional shape of the windshield molding 1 is defined.

Furthermore, on the second die 32 is disposed so as to protrude upward and obliquely a lip removing piece 33 for closing and opening the extrusion defining side portion 31c corresponding to the ridge piece 20 which is disposed on the extrusion-molding port 31a of the first die 31. The lip removing piece 33 is disposed unitedly to the second die 32, and disposed so as to move together with the second die 32. The extrusion defining side 33a formed on lip removing piece 33 is formed so as to extend upward and obliquely in the drawing with a predetermined angle "b°" with respect to the extrusion defining side portion 31d of the first die 31.

The inclination angle "b°" which is set at the extrusion defining side portion 33a of the lip removing piece 33 on the second die 32 is slightly less than the above-mentioned inclination angle "a°" which is set at the extrusion defining side portion 31c of the first die 31 corresponding to the ridge piece 20 (b<a), and the whole protrusion amount "B" of the lip removing piece 33 with respect to the horizontal direction is set slightly larger than the protrusion amount "A" of the extrusion defining side portion 31c corresponding to the ridge piece 20 (B>A). That is, this lip removing piece 33 is adapted to gradually close the extrusion defining side portion 31c corresponding to the ridge piece 20 toward the root side (left side in the drawing) from the leading end side (right side in the drawing) when the second die 32 ascends from the lower portion of FIG. 1, whereby the ridge piece 20 is gradually removed from the leading end side to the root side.

Incidentally, the above-mentioned inclination angle "b°" which is set at the extrusion defining side portion 33a of the lip removing piece 33 on the second die 32 and the inclination angle "a°" which is set at the extrusion defining side portion 33c corresponding to the ridge piece 20 at the first die 31 are not necessarily less than 90° with respect to the extrusion defining side portion 31d of the first die 31. The same is true of the case of the set angle of not less than 90° if the relation of b<a is satisfied.

An embodiment of the method of manufacturing the molding 1 which uses such a manufacturing apparatus will be described hereinafter.

In a case where the side molding 1S is extrusion-molded, the second die 32 is held at a position lower than that shown in FIG. 1, whereby the extrusion-molding port 31a of the first die 31 is opened in the maximum, and the side molding 1S which is the maximum in height is extrusion-molded. On this occasion, the lip removing piece 33 of the second die 32 is lowered at a position at which the extrusion defining side portion 31c of the first die 31 corresponding to the ridge piece 20 is not closed, which brings about the entire opening of the extrusion defining side portion 31c corresponding to the ridge piece 20, then the ridge piece 20 is extrusion-molded at the constant sectional shape throughout the entire length thereof.

Next, when the corner molding 1C is begun to be extruded, the second die 32 starts to ascend gradually, whereby the extrusion-molding port 31a of the first die 31 reduces in size, and the molding 1 decreases gradually in molding height. With the ascent of the second die 32, the extrusion defining side portion 31c of the first die 31 corresponding to the ridge piece 20 is closed gradually from the leading end side (right side in the drawing) toward the root side (left side in the drawing) by the lip removing piece 33 of the second die 32, so that the ridge piece 20 is gradually removed from the leading end side (right side in the drawing) toward the root side (left side in the drawing).

The extrusion defining side 31c of the first die 31 corresponding to the ridge piece 20 is covered perfectly by the lip removing piece 33 of the second die 32, so that the ridge piece 20 is removed perfectly from the molding main body 10. At this point of time, the extrusion-molding for the molding 1 proceeds to a portion corresponding to the upper molding 1U. On this occasion, the second die 32 is held at the highest position represented by the dotted line in FIG. 1. Whereby, the upper molding 1U which has not the ridge piece 20 is extrusion-molded with the constant contour throughout the entire length. After that, the corner molding 1C and the side molding 1S are extrusion-molded again by the operation opposite to the above-mentioned operation.

According to the above-mentioned molding manufacturing apparatus, the ridge piece 20 is removed only by the movement of the second die 32, and is removed gradually from the leading end side toward the root side with the initial thickness maintained without thinning. Therefore, the ridge piece 20 can be removed only by the controlling the movement of the second die 32 without the after-treatment.

The lip removing piece 33 is moved together with the second die 32 in an opposite direction after the ridge piece 20 is removed from the molding main body 10, the lip removing piece 33 is moved gradually from the root side toward the leading end side of the ridge piece 20, the ridge piece 20 is formed gradually from the root side toward the leading end side.

To this end, after the ridge piece 20 is removed from the molding main body 10, the ridge piece 20 is formed on the molding main body 10 again by the lip removing piece 33 moving together with the second die 32 which changes the extrusion contour of the molding main body 10, and the ridge piece 20 is formed gradually from the root side toward the leading end side with the initial thickness maintained without thinning. Accordingly the ridge piece 20 is formed again only by controlling the movement of the second die 32 without the after-treatment.

Moreover, since the extrusion-molding port 31a of the first die 31 is changed in magnitude of section, the extrusion amount of the material (synthetic resin) is changed accordingly. Over against this, the injection amount of the material is controlled directly by controlling the rotational speed of a screw of the extruder, or a hole for discharging the surplus materials is disposed on, for example, a front surface of the second die 32.

The invention made by the inventors is described above in specific terms with reference to one embodiment. However, the invention is not restricted to the above-mentioned embodiment. It is without saying that the invention can be optionally modified as long as it is not deviated from the gist of the invention. For example, the lip removing means is not restricted to the shutter type one as the above-mentioned embodiment, all the removing means such as a cutter is used therefore. Also, such a lip removing means may be arranged on the extrusion-molding port in a close contact manner as the above-mentioned embodiment as well as in a separate manner.

Further, the invention can be applied to various kinds of the moldings other than the above-mentioned molding for use in the vehicle, in the same way.

What is claimed is:

1. A method for producing a molding strip for a vehicle window opening, said molding strip having a side molding part, a corner molding part, and an upper molding part, each of said parts having inner and outer ornament portions, a glass engagement groove, and a leg portion, said leg portion connected to said inner and outer ornament portions, said side molding part having a ridge piece extending as a lip from said leg portion, said ridge piece of said side molding part being limited in extent such that said ridge piece does not extend to said upper molding part, said leg portion of said side molding part gradually being reduced in size such that the leg portion of said upper molding part is smaller than the leg portion of said side molding part, said method comprising the steps of:

extruding molding material through an opening in a first die while blocking off part of said opening with a second die, the first and second dies situated in a first position so as to form said side molding part of said molding;

continuing to extrude said molding material while translating said second die relative to said first die in a first direction toward a second position of said second die, thereby gradually reducing in size said ridge piece of said side molding part and said leg portion to thereby form a corner part, said ridge piece being reduced in size from a leading end toward a root side; and extruding an upper part of said molding strip wherein said second die is positioned relative to said first die so as to be in said second position thereby forming said upper molding part of said molding.

2. The method according to claim 1, further comprising the steps of:

continuing to extrude said molding material while moving said second die in a second direction opposite to said first direction, to thereby start forming said ridge piece and to gradually increase in size said leg portion and said ridge piece to thereby form a second corner part, said ridge piece being increased in size from the root side toward the leading end; and extruding a second side part of said molding strip wherein said second die is positioned in said first position.

3. An apparatus for manufacturing a continuous extrusion molding, which comprises:

a first die having a port, the port having a shape of an elongate body with a ridge piece protruding from said elongate body as a lip, said port having one end in the shape of inner and outer ornament portions; and a second die having an extrusion defining contour in communication with said port of said first die to form an end region of the molding opposite to the end the molding having the shape of inner and outer ornament portions, said extrusion defining contour includes a leg portion surface and a supporting piece surface, said second die having a lip removing member for removing said ridge piece, said second die located adjacent to and in a plane parallel to said first die, said second die movable relative to said first die in a direction perpendicular to an extrusion direction, wherein, when the second die is moved relative to the first die to a first position thereby forming a side molding part, said side molding part includes a ridge piece extending as a lip from a leg portion, when the second die is moved relative to the first die toward a second position thereby gradually reducing in size said ridge piece of said side molding part and said leg portion to thereby form a corner molding part, when the second die is moved relative to the first die to the second position thereby forming an upper molding part including a leg portion, each of said side molding, corner molding and upper molding parts include a glass engagement groove and inner and outer ornament portions connected to said leg portion.

4. An apparatus for manufacturing moldings, according to claim 3, wherein said lip removing member comprises a lip removing piece connected to said second die for opening or closing the ridge piece portion of said port of said first die.

5. An apparatus for manufacturing moldings, according to claim 4, wherein said ridge piece of said port of said first die includes a root side and a leading end, and said lip removing piece is adapted to close said ridge piece portion of said port of said first die from the leading end toward the root side.

* * * * *